(12) United States Patent  
Green (10) Patent No.: US 10,547,341 B2  
(45) Date of Patent: *Jan. 28, 2020

(54) CASE AND SHELL FOR A SMART PHONE

(71) Applicant: Andrew Bradford Green, Mt. Pleasant, SC (US)

(72) Inventor: Andrew Bradford Green, Mt. Pleasant, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/872,161

(22) Filed: Jan. 16, 2018

(65) Prior Publication Data

US 2018/0205410 A1    Jul. 19, 2018

Related U.S. Application Data

(63) Continuation of application No. 15/071,829, filed on Mar. 16, 2016, now Pat. No. 9,871,547.

(60) Provisional application No. 62/133,563, filed on Mar. 16, 2015.

(51) Int. Cl.

| H04M 1/00 | (2006.01) |
| H04B 1/3888 | (2015.01) |
| A45C 11/00 | (2006.01) |
| A45C 11/18 | (2006.01) |
| H04M 1/725 | (2006.01) |

(52) U.S. Cl.  
CPC ............ H04B 1/3888 (2013.01); A45C 11/00 (2013.01); A45C 11/182 (2013.01); A45C 2011/002 (2013.01); A45C 2200/15 (2013.01); H04M 1/72519 (2013.01); H04M 1/72522 (2013.01)

(58) Field of Classification Search  
CPC ...... H04Q 1/243; H04B 1/3833; H04B 1/385; H04M 1/23; H04M 1/0214; H04M 1/18; H04M 1/72519; B65D 5/4204; B65D 5/5016; B65D 5/4208  
USPC .................. 455/575.8, 575.1, 90.3; 206/775  
See application file for complete search history.

(56) References Cited

U.S. PATENT DOCUMENTS

| 4,592,177 | A | * | 6/1986 | Pratt | F21V 21/36 |
| | | | | | 248/188.6 |
| 4,947,984 | A | * | 8/1990 | Kaufman | A45C 11/34 |
| | | | | | 206/1.7 |
| 8,328,008 | B2 | * | 12/2012 | Diebel | A45C 11/00 |
| | | | | | 206/305 |
| 2008/0052354 | A1 | * | 2/2008 | Barber-Mingo | G06Q 10/107 |
| | | | | | 709/204 |
| 2010/0048268 | A1 | * | 2/2010 | O'Neill | H04B 1/3888 |
| | | | | | 455/575.8 |
| 2010/0118485 | A1 | * | 5/2010 | Crooijmans | G06F 1/1632 |
| | | | | | 361/679.43 |

(Continued)

*Primary Examiner* — Danh C Le  
(74) *Attorney, Agent, or Firm* — Wayne Edward Ramage; Baker Donelson (57) ABSTRACT

A protective case with removable shell for holding and camouflaging a smart phone or similar device, such as, but not limited to, an iPhone. The case comprises a front cover and a back cover, which may be rigid or hardback. The front and back covers are hingedly connected along one edge by a spine. A plurality of tabs extending from the inside of the back cover differentially engage corresponding slots in the back of the removable shell, allowing the case and shell to be configured in various positions. The inside of the front cover contains various slots or pockets, and functions as a wallet. The exterior of the case has the appearance of a book, which helps disguise the fact that the case holds a smart phone or similar device.

6 Claims, 7 Drawing Sheets

(56) References Cited

U.S. PATENT DOCUMENTS

| | | | |
|---|---|---|---|
| 2012/0074006 A1* | 3/2012 | Monaco | H04M 1/15 206/320 |
| 2012/0147536 A1* | 6/2012 | Sa | G06F 1/1632 361/679.01 |
| 2012/0194985 A1* | 8/2012 | Renteria Villagomez | G06Q 50/12 361/679.02 |
| 2013/0175200 A1* | 7/2013 | Poon | F16M 13/00 206/759 |
| 2014/0091689 A1* | 4/2014 | Mishan | H05K 5/02 312/237 |
| 2015/0076020 A1* | 3/2015 | Smith | A45C 11/00 206/320 |
| 2015/0296946 A1* | 10/2015 | Buechin | A45C 11/00 206/45.23 |

* cited by examiner

CASE AND SHELL FOR A SMART PHONE

This application is a continuation of U.S. patent application Ser. No. 15/071,829, filed Mar. 16, 2016, which claims benefit of and priority to U.S. Provisional Application No. 62/133,563, filed Mar. 16, 2015, by Andrew B. Green, and is entitled to that filing date for priority. The specifications, figures, appendices and complete disclosures of U.S. Provisional Application No. 62/133,563 and application Ser. No. 15/071,829 are incorporated herein in their entireties by specific reference for all purposes.

FIELD OF INVENTION

This invention relates generally to a case or holder with removable shell for portable electronic devices and smart phones.

BACKGROUND OF THE INVENTION

The proliferation of portable electronic devices and tablet computing devices is well known. Each successive iteration or generation provides increasingly greater features and capabilities, typically through a variety of user-friendly, content-specification applications (or "apps"). One market segment that has shown exemplary growth are tablet computing devices, which continue to impact the way people manage business, interact with each other, and conduct their daily lives.

Because these devices are intended to be portable and carried by the user, they are susceptible to damage from being dropped or hit. While some damage may be superficial or cosmetic, other damage may impair the functioning of the device (e.g., fractured screen or lens).

A variety of protective cases are known in the art for encasing and protect portable electronic devices from possible damage, particularly in the case of cell phones or smart phones. While some cases are known for use with tablet computing devices, such as those disclosed in U.S. Pat. Nos. 8,312,991 and 8,328,991, which are incorporated herein by specific reference for all purposes, these cases do not always allow complete access to all functions and capabilities of the device while presenting an aesthetically pleasing and protective appearance. Accordingly, there is a need for cases for tablet computing devices that will protect the device while allowing full functionality and use of the device with an aesthetically pleasing and protective appearance.

SUMMARY OF INVENTION

In various embodiments, the present invention comprises a case with removable shell for holding and camouflaging a smart phone or similar device, such as, but not limited to, an iPhone 6 or iPhone 6 Plus. The case comprises a front cover and a back cover, which may be rigid or hardback. The corners of either or both covers may be reinforced for protection from impacts. The front and back covers are hingedly connected along one edge by a spine. In one embodiment, the spine is rigid to provide additional protection to the smart phone. The exterior of the covers and spine may be made of any suitable material, including, but not limited to, leather, simulated leather, cardboard, plastic, or the like.

The front and back covers may be closed in book fashion. The covers may or may not be secured. The interior of the case comprises a shell that securely holds the smart phone around its perimeter. The front of the shell is open to provide access to the smart phone screen and controls. The back of the shell may be open in whole or in part. The inside of the back of the shell may be lined by appropriate material, including, but not limited to, leather, cork, felt or the like. At a minimum, the shell provides openings or cut-outs in the back and sides for any camera lens, power ports, speakers and headphone connections, or other controls or ports on the back or sides of the smart phone. Openings or cut-outs in the back cover of the case may be provided to correspond to openings or cut-outs in the shell. This allows the phone to be used when inserted in the shell by itself and still be protected (such as when being inserted in a hands-free car mount, sport band, or the like), or when mounted with the shell in the case.

The shell may be permanently affixed or removably affixed to the back cover. In one exemplary embodiment, the shell is removably attached to the back cover by means of a plurality of tabs and slots. In one embodiment, two columns of tabs extend from the inside of the back cover. Each tab comprises a post with a wider and longer head, appearing like a "T" in cross-section. The post and head may be elongated in one direction. The tabs may be plastic, metal, or other suitable material, and be attached to or integral with a support inside the back cover. In the embodiment shown, there are three tabs in each column, each column of tabs with its own support. The supports may be separate or hingedly attached, so as to allow the back cover to bend or fold along a vertical axis.

A corresponding slot for each tab is located in the back of the shell. Each slot has a wider area adapted to allow the head of the corresponding tab to be fully inserted therein. The tab can then be moved along the length of the slot until the head has been moved over a narrow portion of the slot and thereby secure the tab in the slot.

In the embodiment shown, the slots are not identical, although they may be the same length. The column of slots nearest the spine when the shell is mounted on the case comprises a first type of slot while the column of slots furthest from the spine comprises a second type of slot. The first type of slot are narrow at the end nearest the spine when mounted, and wide in the middle and the opposite end. The second type of slot are narrow at both ends, and wide only in the middle. This configuration of slots and tabs allows for the shell and case to be configured in at least three different positions.

The inside of the front cover may be plain, or some or all may be covered by a soft covering, such as suede leather, suede fabric, other fabric or cloth, foam padding, or the like. This covering may also extend to the interior of the back cover. The soft interior covering protects the phone's finish and screen.

In various embodiments, the inside front cover also comprises a plurality of slots or pockets suitable for holding credit cards or the like, and may include a transparent plastic cover over a slot compartment for a driver's license, ID card, or the like, which then can be displayed by flipping the cover open. An opening in the transparent cover may be provided to allow ease of removal of the driver's license or other item. A side-entry pocket may also be provided for storage of money or similar items, thereby allowing the case to function as a wallet in addition to a phone case.

In several exemplary embodiments, the exterior of the device has the appearance of a book, such as an old or vintage book. The exterior may have a distressed finish. When closed, the device thus appears to be an old or vintage book, disguising the fact that a smart phone device is contained inside. This reduces the risk of theft.

DETAILED DESCRIPTION OF EXEMPLARY EMBODIMENTS

In various exemplary embodiments, as described herein, and as seen in FIGS. 1-14, the present invention comprises a case 2 with removable shell 4 for holding and camouflaging a smart phone or similar device 6, such as, but not limited to, an iPhone 6 or iPhone 6 Plus. The case 2 comprises a front cover 10 and a back cover 12, which may be rigid or hardback. The corners of either or both covers may be reinforced for protection from impacts. The front and back covers are hingedly connected along one edge by a spine 16. In one embodiment, the spine is rigid to provide additional protection to the smart phone. The exterior of the covers 10, 12 and spine 16 may be made of any suitable material, including, but not limited to, leather, simulated leather, cardboard, plastic, or the like.

Figure 6:
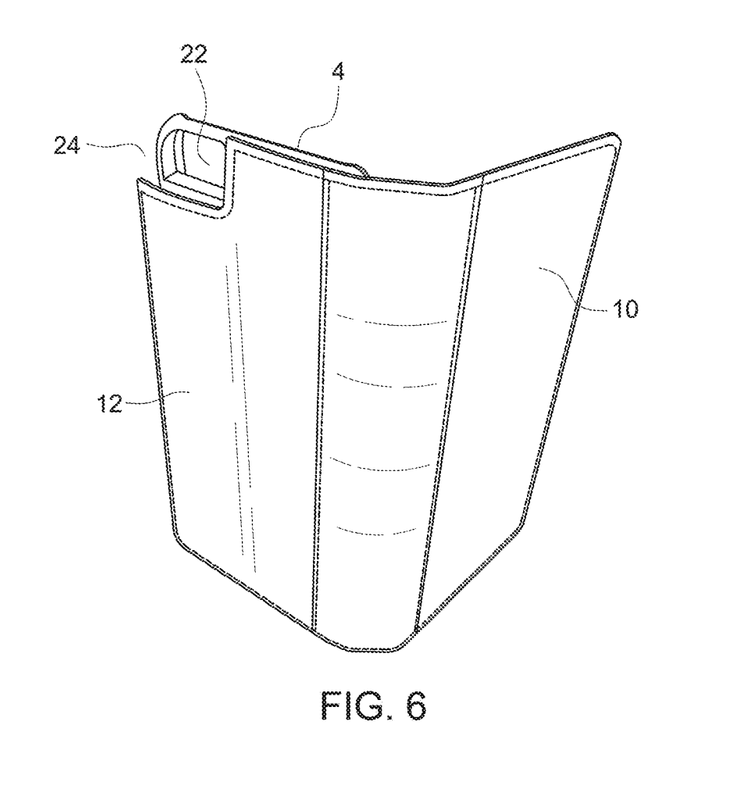
FIG. 6 shows a perspective view of the exterior of the case when opened.
Figure 7:
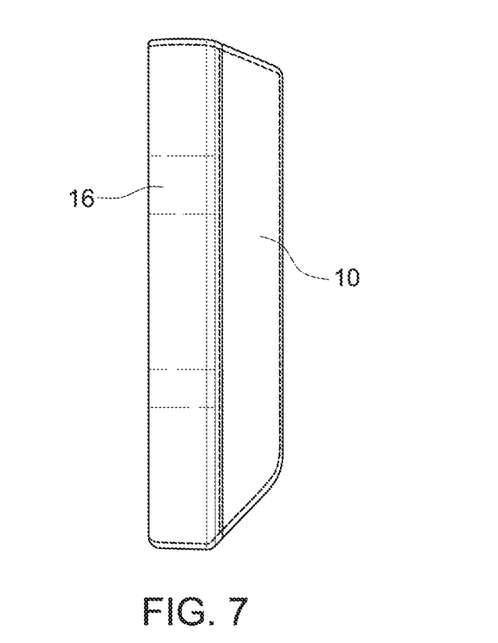
FIG. 7 shows a perspective view of the exterior of the case when closed.
Figure 8:
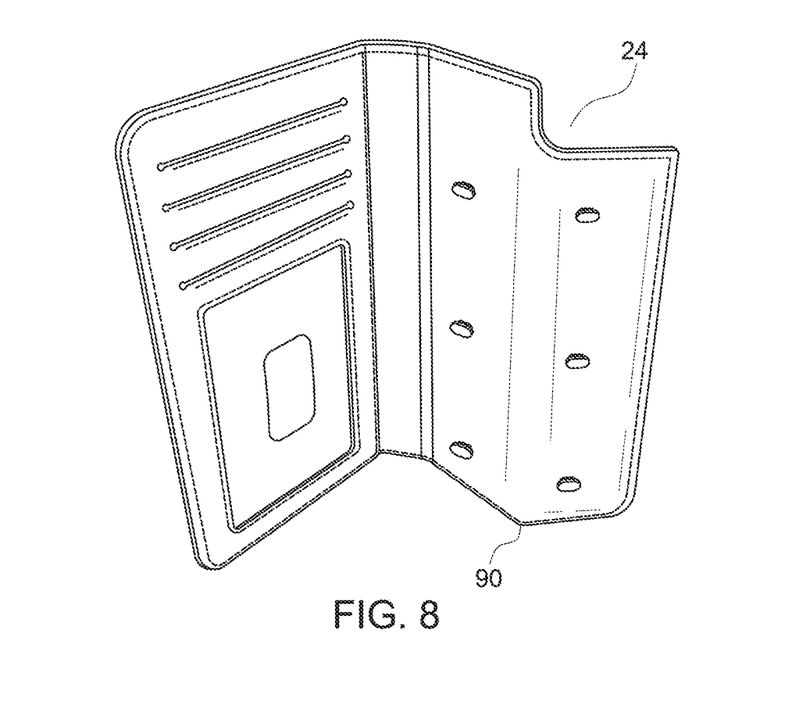
FIG. 8 shows a perspective view of the interior of the case when opened.
Figure 9:
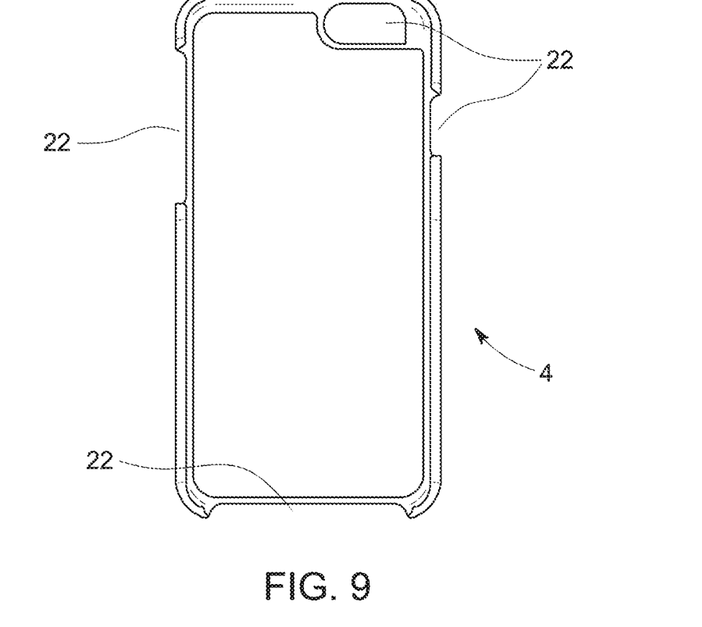
FIG. 9 shows a front view of the shell.
Figure 10:
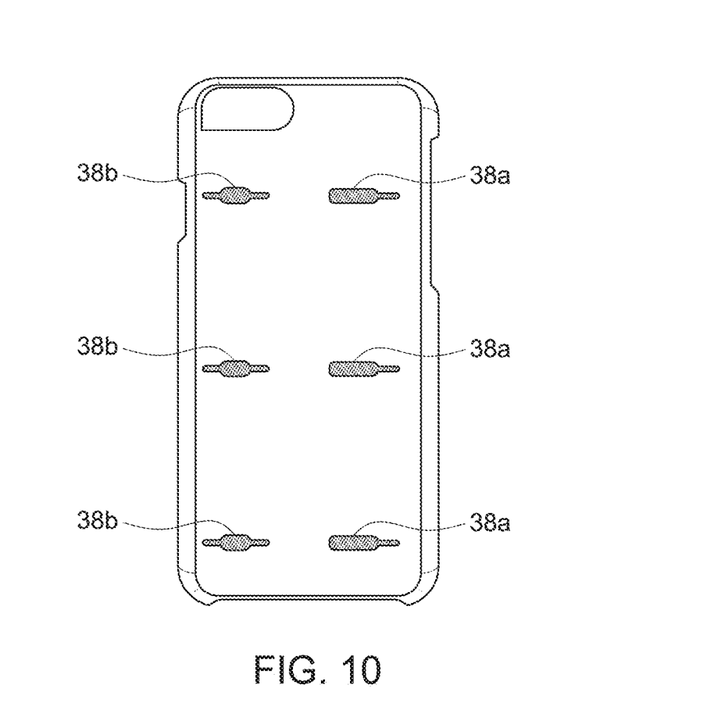
FIG. 10 shows a back view of the shell.
Figure 11:
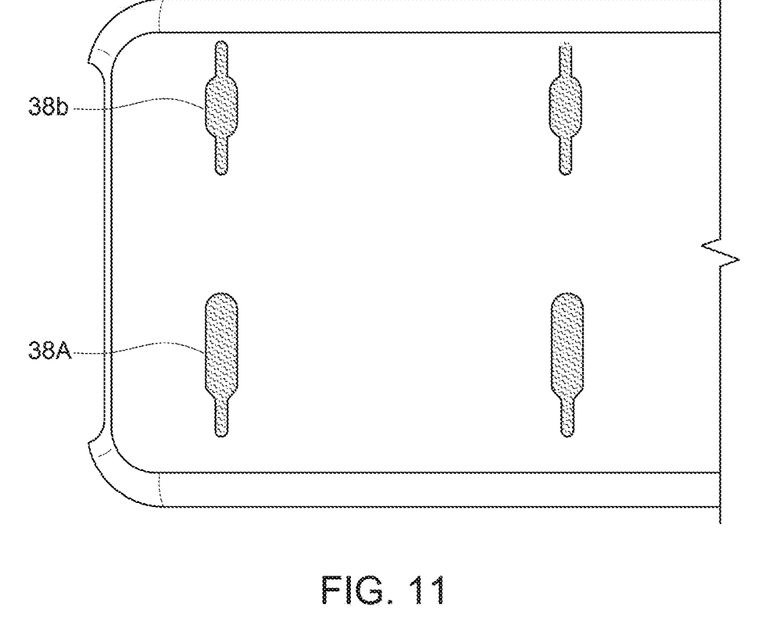
FIG. 11 shows a detailed view of a portion of the back of the shell.

The front and back covers may be closed in book fashion, as seen in FIGS. 6 and 7. The covers may or may not be secured. In one exemplary embodiment, the edges of the front and back covers (not including the spine) may be zippered together. In one embodiment, dual zippers are provided. This allows the user to unzip the device along one end just enough to connect a power cord, headphone cable, or the like, without having to unzip the other end. In an alternative embodiment, the covers are not secured when closed.

The interior of the case comprises a shell 4 that securely holds the smart phone 6 around its perimeter. The front of the shell is open to provide access to the smart phone screen and controls. The back of the shell may be open in whole or in part. The inside of the back of the shell may be lined by appropriate material, including, but not limited to, leather, cork, felt, or the like. At a minimum, the shell provides openings or cut-outs 22 in the back and sides for any camera lens, power ports, speakers and headphone connections, or other controls or ports on the back or sides of the smart phone. Openings or cut-outs 24 in the back cover 12 of the case may be provided to correspond to openings or cut-outs 22 in the shell. This allows the phone to be used when inserted in the shell by itself and still be protected (such as when being inserted in a hands-free car mount, sport band, or the like), or when mounted with the shell in the case.

Figure 1:
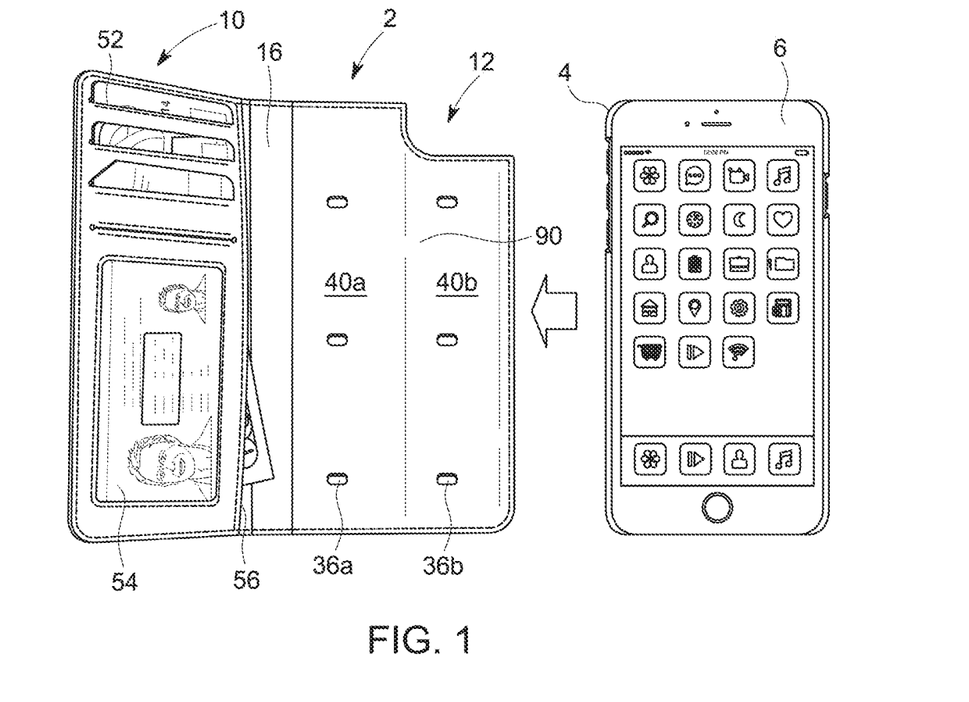
FIG. 1 shows a view of case with a shell holding a smart phone, with the shell removed from the case.
Figure 2:
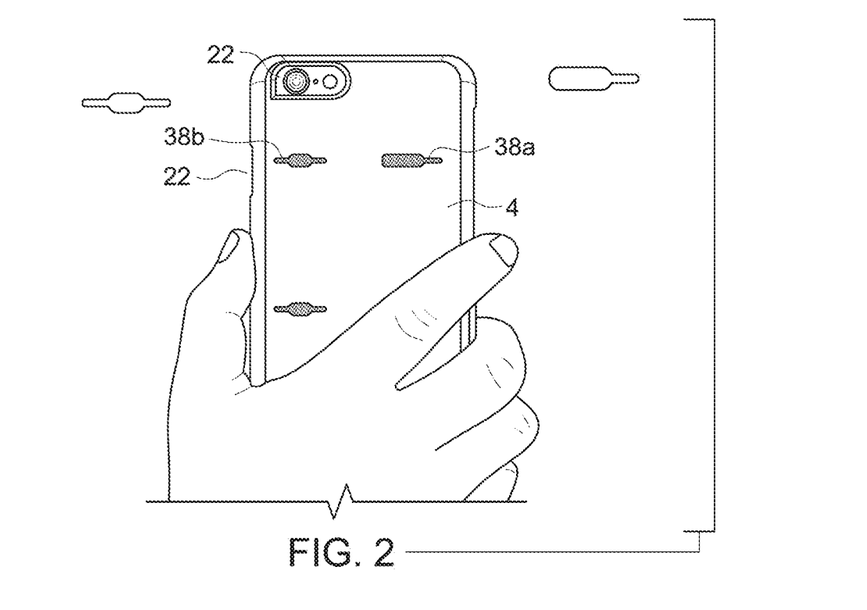
FIG. 2 shows a back view of a shell holding a smart phone.
Figure 3:
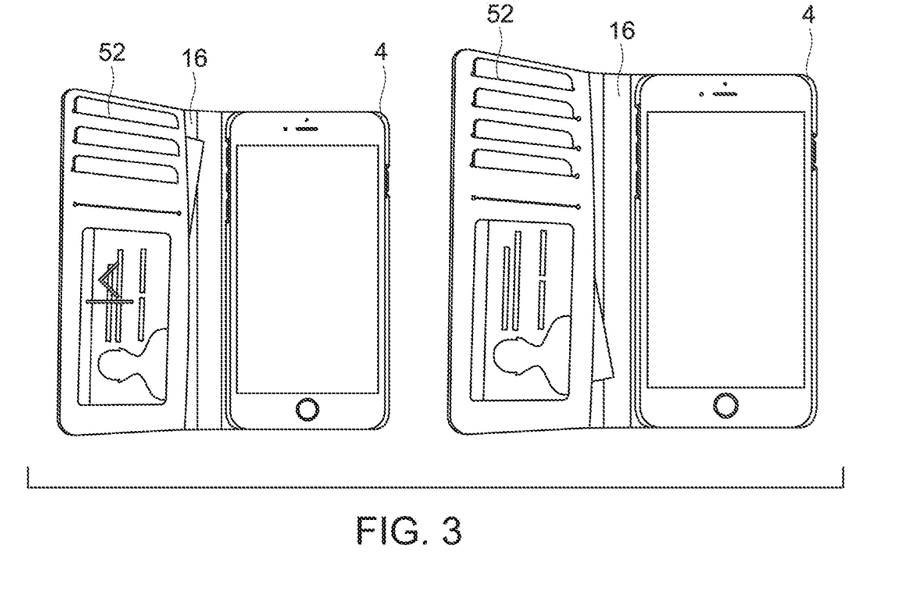
FIG. 3 shows views of cases with shells mounted on the case, with five and six pockets.

The shell may be permanently affixed or removably affixed to the back cover. In one exemplary embodiment, the shell is removably attached to the back cover by means of a plurality of tabs 36a, b and slots 38a, b. In the embodiment shown, two columns of tabs extend from the inside of the back cover. Each tab comprises a post with a wider and longer head, appearing like a "T" in cross-section. The post and head may be elongated in one direction. The tabs may be plastic, metal, or other suitable material, and be attached to or integral with a support inside the back cover. In the embodiment shown, there are three tabs in each column, each column of tabs with its own support 40a, b. The supports may be separate, or hingedly attached, so as to allow the back cover to bend or fold along a vertical axis 90. As seen in FIG. 1, the column of tabs 36a to the left (or inside) of the vertical axis 90 may be referred to as the "a" column, while the column of tabs 36b to the right (or outside) of the vertical axis 90 may be referred to as the "b" column.

A corresponding slot 38a, b for each tab 36a, b is located in the back of the shell. Each slot has a wider area adapted to allow the head of the corresponding tab to be fully inserted therein. The tab can then be moved along the length of the slot until the head has been moved over a narrow portion of the slot and thereby secure the tab in the slot.

In the embodiment shown, the slots are not identical, although they may be the same length. The "a" column of slots nearest the spine when the shell is mounted on the case (corresponding to the "a" column of tabs) comprises a first type of slot 38a while the "b" column of slots furthest from the spine (corresponding to the "b" column of tabs) comprises a second type of slot 38b. The first type of slot 38a are narrow at the end nearest the spine when mounted, and wide in the middle and the opposite end. The second type of slot 38b are narrow at both ends, and wide only in the middle. This configuration of slots and tabs allows for the shell and case to be configured in at least three different positions, as described below.

The tabs and slots are spaced so that the tabs 36a, b can be inserted into the wide middle section of each corresponding slot 38a, b simultaneously in a first position. This allows the shell to be freely moved on or off all of the tabs at the same time.

Figure 14:
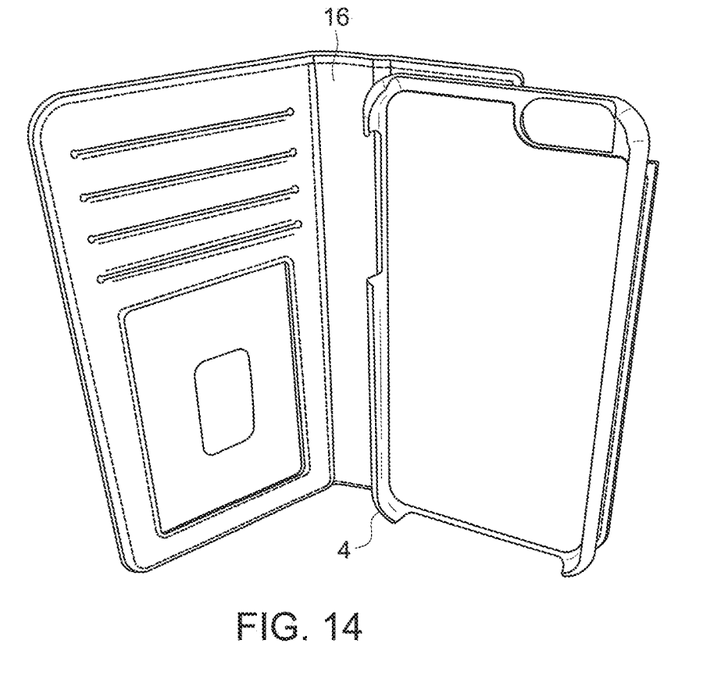
FIG. 14 shows a perspective view of the case with shell connected along both "a" and "b" columns of tabs and slots.

From the first position, the shell can be slid to the right (i.e., away from the spine) to a second position, thereby causing all of the tabs to engage narrow areas in all of the slots, securely mounting the shell (and phone) to the case, as seen in FIG. 14. Movement in this direction is limited by the end of the slots (these ends of the slots are those nearest to the spine, while the shell itself is in a position further from the spine). The shell is held in place by pressure or friction caused by the depth of the back of the shell in comparison to the height of the heads of the tab from the back of the case.

From the fully secured position (second position), the movement can be reversed for complete removal of the shell. However, the shell also can be moved to a third position, where the tabs are moved to the opposite end of each slot from the second position (i.e., to the ends of the slots furthest from the spine). In the third position, the "a" column tabs 36a can be freely removed from the first type of slot 38a because this end of the slot is wide, while the "b" column tabs 36b corresponding to the second type of slot

Figure 4:
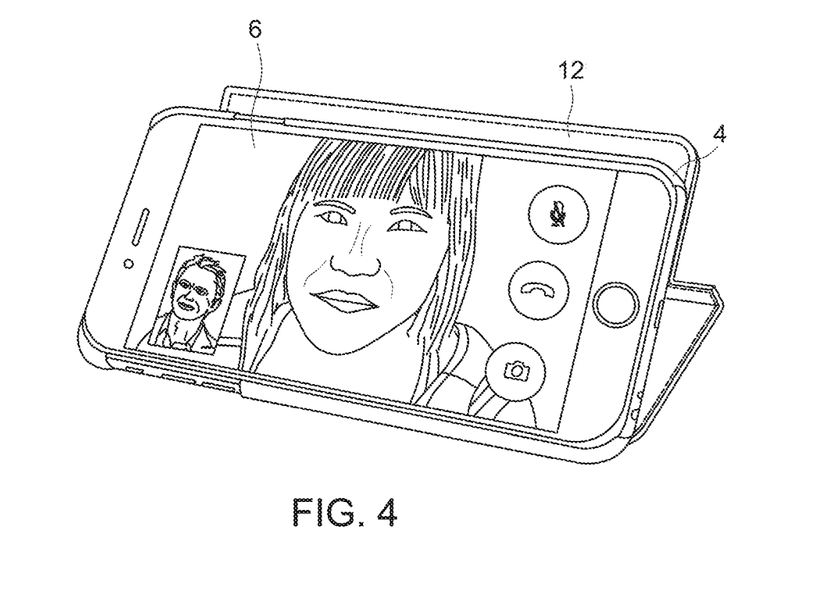
FIG. 4 shows a view of a case in display stand configuration.
Figure 12:
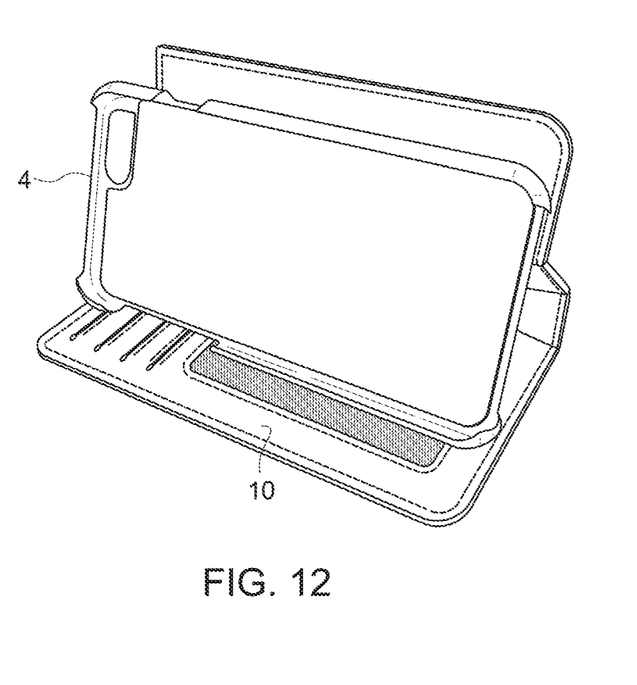
FIG. 12 shows a view of the case in display stand configuration, without a smart phone.
Figure 13:
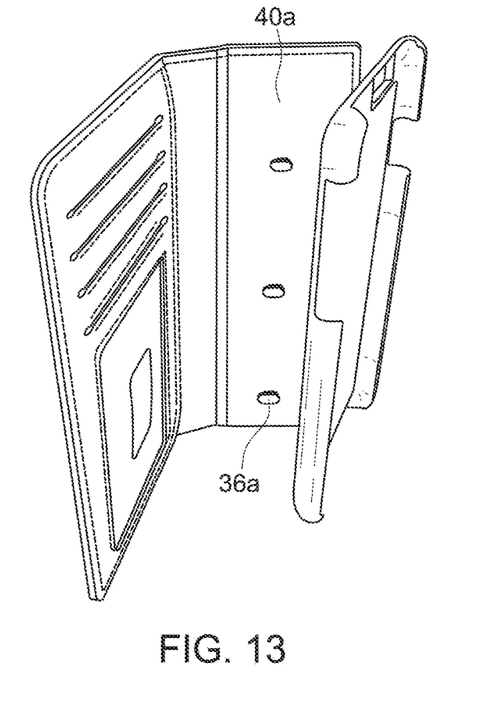
FIG. 13 shows a perspective view of the case with shell connected along the "b" column of tabs and slots.

38*b* are still secured (the end of these slots is narrow). This allows the left side of the shell (with phone) to be lifted away from the back of the case, and the back of the case folded over the axis 90 to form a hands-free display stand for viewing, typing or otherwise using the phone, as seen in FIGS. 4, 12 and 13. The column "b" tabs 36*b* in the second type of slot 38*b* can, in fact, be moved to either end of the slot 38*b* (both ends are narrow) without re-engaging the column "a" tabs 36*a* with the first type of slot 38*a*, thereby allowing the hands-free display to be positioned at different angles, if desired.

The case also allows the phone to be positioned vertically by opening the front cover and standing the case on its bottom end, as seen in FIGS. 13 and 14. In any of the above positions, group photos can be taken using a self-timer in the phone's operating system, for example.

In the embodiments described herein, the smart phone is inserted into the shell by inserting or sliding it into the open front, and then snapping it into place with appropriate pressure applied to the corners or sides of the phone. The phone is held securely in the shell by pressure and friction, but can be removed by the user when desired. The shell may be made of any suitable material, including, but not limited to, plastic, wood, metal, cardboard, or the like. In one embodiment, the shell is made of "soft-touch" moulded plastic. In another embodiment, the shell is made of textured moulded plastic.

The inside of the front cover may be plain, or some or all may be covered by a soft covering, such as suede leather, suede fabric, other fabric or cloth, foam padding, or the like. This covering may also extend to the interior of the back cover. The soft interior covering protects the phone's finish and screen.

Figure 5:
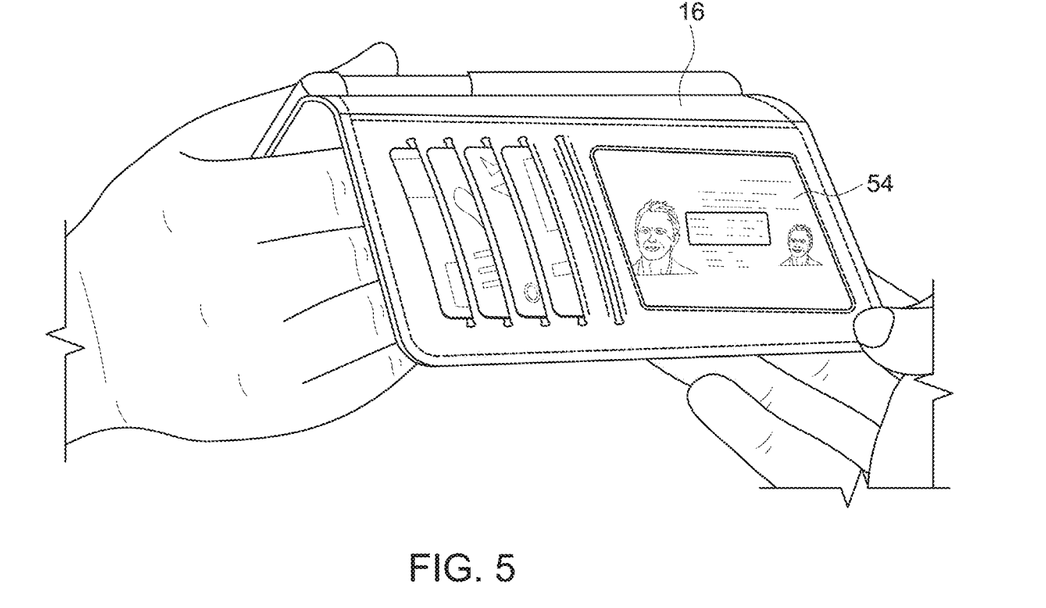
FIG. 5 shows a view of a case in wallet display configuration.

In various embodiments, the inside front cover also comprises a plurality of slots or pockets 52 suitable for holding credit cards or the like, and may include a transparent plastic cover 54 over a slot compartment for a driver's license, ID card, or the like, which then can be displayed by flipping the cover open, as seen in FIG. 5. An opening in the transparent cover may be provided to allow ease of removal of the driver's license or other item. A side-entry pocket 56 may also be provided for storage of money or similar items, thereby allowing the case to function as a wallet in addition to a phone case.

In several exemplary embodiments, the exterior of the device has the appearance of a book, such as an old or vintage book. The exterior may have a distressed finish. When closed, the device thus appears to be an old or vintage book, as seen in FIG. 7, disguising the fact that a smart phone device is contained inside. This reduces the risk of theft.

In one exemplary embodiment, the case is approximately 2.87 to 3.34 inches wide, 5.5 to 6.3 inches long, 0.79 inches thick, and weighs approximately 2.3 to 3.2 ounces.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

What is claimed is:

1. A holder for a smart phone, comprising:
   a case with a front cover and a back cover hingedly attached along a spine, the front cover comprising an interior side and an exterior side, and the back cover comprising an interior side and an exterior side;
   a plurality of tabs extending from the interior side of the back cover configured in at least two columns;
   a removable shell with a back and sides, said shell configured to securely hold a smart phone; and
   a plurality of slots in the back of the removable shell configured in at least two columns, each slot further configured with wide areas and narrow areas to receive and slidingly engage a corresponding tab;
   wherein there are at least a first column of said slots and a second column of said slots, further wherein the slots of the first column are narrow at the end nearest the spine, wide in the center, and wide at the end furthest from the spine, and the slots of the second column are narrow at the end nearest the spine, wide in the center, and narrow at the end further from the spine.

2. The holder of claim 1, wherein the case and shell are configured to move between an unengaged position, a partially engaged position where only the slots of the second column are engaged with corresponding tabs, and a fully engaged position where all slots are engaged with corresponding tabs.

3. The holder of claim 1, wherein the inside of the front cover further comprises a plurality of pockets.

4. The holder of claim 1, wherein the exterior of the case has the appearance of a book.

5. The holder of claim 1, wherein the tabs are T-shaped in cross-section.

6. The holder of claim 1, wherein the shell comprises one or more openings or cut-outs in the back or sides.

\* \* \* \* \*